(12) United States Patent
Dai

(10) Patent No.: US 10,691,866 B2
(45) Date of Patent: Jun. 23, 2020

(54) DIE INTERFACE ENABLING 2.5D DEVICE-LEVEL STATIC TIMING ANALYSIS

(71) Applicant: Credo Technology Group Limited, Grand Cayman (KY)

(72) Inventor: Yifei Dai, Shanghai (CN)

(73) Assignee: Credo Technology Group Limited, Grand Cayman (KY)

( * ) Notice: Subject to any disclaimer, the term of this patent is extended or adjusted under 35 U.S.C. 154(b) by 0 days.

(21) Appl. No.: 16/026,950

(22) Filed: Jul. 3, 2018

(65) Prior Publication Data

US 2019/0050519 A1 Feb. 14, 2019

(30) Foreign Application Priority Data

Aug. 9, 2017 (CN) .......................... 2017 1 0675380

(51) Int. Cl.
*G06F 30/398* (2020.01)
*G06F 30/3312* (2020.01)
(Continued)

(52) U.S. Cl.
CPC ........ *G06F 30/398* (2020.01); *G06F 30/3312* (2020.01); *G06F 2111/20* (2020.01); *G06F 2119/12* (2020.01)

(58) Field of Classification Search
CPC ............. G06F 17/5031; G06F 17/5081; G06F 2217/02; G06F 2217/84; G06F 2111/20;
(Continued)

(56) References Cited

U.S. PATENT DOCUMENTS

| | | | |
|---|---|---|---|
| 5,956,257 A * | 9/1999 | Ginetti ................. | G06F 17/505 716/103 |
| 6,751,579 B1 * | 6/2004 | Misheloff ........... | G06F 17/5022 703/2 |

(Continued)

OTHER PUBLICATIONS

Gupta, et al. CMOS Voltage Level-Up Shifter—A Review, International Journal of Advances in Engineering Sciences vol. 3 (3), Jul. 2013.

(Continued)

*Primary Examiner* — Vuthe Siek
(74) *Attorney, Agent, or Firm* — Ramey & Schwaller LLP; Daniel J. Krueger

(57) ABSTRACT

A circuit design verification method suitable for use with a 2.5D transceiver device potentially having hundreds of dice mounted on an interposer. An illustrative method includes: (a) retrieving a design of a circuit that includes multiple integrated circuit dice connected via an interposer, each die having at least one contact for receiving or transmitting a digital signal conveyed by an interchip connection of the interposer, said circuit including an IO cell for each such contact; (b) obtaining a timing model for components of said circuit, the timing model accounting for propagation delays of said IO cells and propagation delays of said interchip connections; (c) performing a static timing analysis of the design using the timing model to determine data required times and data arrival times at each of said components; (d) comparing the data required times with the data arrival times to detect timing violations; and (e) reporting said timing violations.

16 Claims, 3 Drawing Sheets

(51) Int. Cl.
*G06F 30/396* (2020.01)
*G06F 111/20* (2020.01)
*G06F 119/12* (2020.01)

(58) Field of Classification Search
CPC ............. G06F 2119/12; G06F 30/3312; G06F 30/398; G06F 30/396
See application file for complete search history.

(56) References Cited

U.S. PATENT DOCUMENTS

| | | |
|---|---|---|
| 9,106,229 B1 * | 8/2015 | Hutton ................. H03K 19/173 |
| 9,166,591 B1 | 10/2015 | Chan et al. |
| 9,473,116 B1 * | 10/2016 | Wang ..................... H03K 3/037 |
| 2015/0113495 A1 * | 4/2015 | Shapiro ................... H01L 25/50 716/122 |
| 2016/0085038 A1 * | 3/2016 | Decker ................ G02B 6/4204 385/14 |
| 2016/0163609 A1 * | 6/2016 | Rahman ................. H01L 22/32 324/762.03 |

OTHER PUBLICATIONS

Wang, et al. Low-Power Small-Area Digital I/O Cell, IEEE Transactions on Circuits and Systems—II: Express Briefs, vol. 52, No. 8, Aug. 2005.
STA—Static Timing Analysis, Lecturer: Gil Rahav, Semester B', EE Dept. BGU, Freescale Semiconductors Israel, downloaded from www.ee.bgu.ac.il/~digivlsi/slides/STA_9_1.pdf on Jun. 16, 2017.

* cited by examiner

DIE INTERFACE ENABLING 2.5D DEVICE-LEVEL STATIC TIMING ANALYSIS

BACKGROUND

Semiconductor manufacturing processes are employed to create integrated circuit (IC) dice, which may be packaged into modular microelectronic assemblies or IC chips for incorporation into electronic systems. This modular approach is driven by the large design and set up costs and the miniscule marginal costs typical of the semiconductor industry, which combine to make the IC products commercially feasible only when a sufficiently large number are manufactured. To maximize their market, the packaged products are equipped with interfaces that enable operation in a variety of contexts.

In particular, this approach militates that the input and output (abbreviated as I/O or IO) contacts be designed for robust operation so as to support signal transfer over suboptimal connections and/or to tolerate electrostatic discharges or other signal transients. Accordingly, IC dice traditionally employ, for each IO contact, a "standard IO cell" including circuitry that protects the delicate on-chip circuitry from a range of external phenomena while providing power for driving output signals onto loaded signal traces and/or for conditioning potentially attenuated and noisy input signals. As the number of IO contacts increases, the area and power requirements for the standard IO cells can dominate the requirements for the on-chip circuitry and in extreme cases may become prohibitive.

Before manufacturing begins, the circuit operation is preferably verified using one or more of the modeling techniques disclosed in the open literature. These modeling techniques include full circuit emulation, though it becomes infeasible for even moderately complex circuits. Static timing analysis (STA) is a popular modeling technique for digital circuits because it is relatively fast, analyzing the circuit in terms of timing constraints and propagation delays to determine transition arrival times for comparison with timing requirements, enabling the calculation of timing margins ("slack") and the discovery of potential timing violations.

The standard IO cells (in this case, standard digital IO cells) are traditionally treated as an outer boundary for static timing analysis for any of multiple reasons including: the permissible degree of variation for the impedance properties of each external trace; the expected variation in loading of different IO contacts; and the greater potential for contamination by signal crosstalk and noise. When a designer wishes to model the behavior of an IC die in the context of a larger electronic assembly, such considerations may require the use of full circuit emulation for proper modeling, despite the aforementioned infeasibility for even moderately complex circuits. Multi-chip modules (MCM), such as those created using 2.5D technology (i.e., microelectronic assemblies formed by mounting multiple IC dice in a "flip-chip" configuration on an "interposer" substrate that provides inter-die connections and connections to the package contacts) with more than a few dice will generally have a complexity beyond this threshold.

SUMMARY

Accordingly, there are disclosed herein a circuit design verification method suitable for use with a 2.5D transceiver device. In one illustrative embodiment, the method includes: (a) retrieving a design of a circuit that includes multiple integrated circuit dice connected via an interposer, each die having at least one contact for receiving or transmitting a digital signal conveyed by an interchip connection of the interposer, said circuit including an IO cell for each such contact; (b) obtaining a timing model for components of said circuit, the timing model accounting for propagation delays of said IO cells and propagation delays of said interchip connections; (c) performing a static timing analysis of the design using the timing model to determine data required times and data arrival times at each of said components; (d) comparing the data required times with the data arrival times to detect timing violations; and (e) reporting said timing violations.

An illustrative transceiver embodiment includes: an interposer; an interface module die connected to the interposer; and multiple serializer-deserializer (SerDes) dice connected to the interposer. The interposer includes interchip connections coupling the serializer-deserializer dice to the interface module die. The interface module die and the multiple SerDes dice each includes IO cells coupled to said interchip connections, each IO cell having an associated timing model for use in a static timing analysis.

Each of the foregoing embodiments may be implemented individually or in combination, and may be implemented with any one or more of the following features in any suitable combination: (1) the circuit design comprises multiple serializer-deserializer dice coupled to an interface module die via parallel data buses formed of said interchip connections. (2) the parallel data buses each include a bus clock signal with transitions used for determining said data required times. (3) on the multiple serializer-deserializer dice the IO cells exclude level shifters while on the interface module die the IO cells may include level shifters. (4) the IO cells include transmit IO cells having a diode voltage limiter. (5) the IO cells include receive IO cells having an electrostatic discharge protection component. (6) each electrostatic discharge protection component comprises two diode voltage limiters separated by a fixed resistance. (7) the timing model accounts for dependence of the propagation delays on temperature and supply voltage. (8) said reporting identifies input or output ports where timing violations are detected along with an associated temperature and supply voltage. (9) the design comprises 100, 200, or more dice connected to said interposer.

Figure 1:
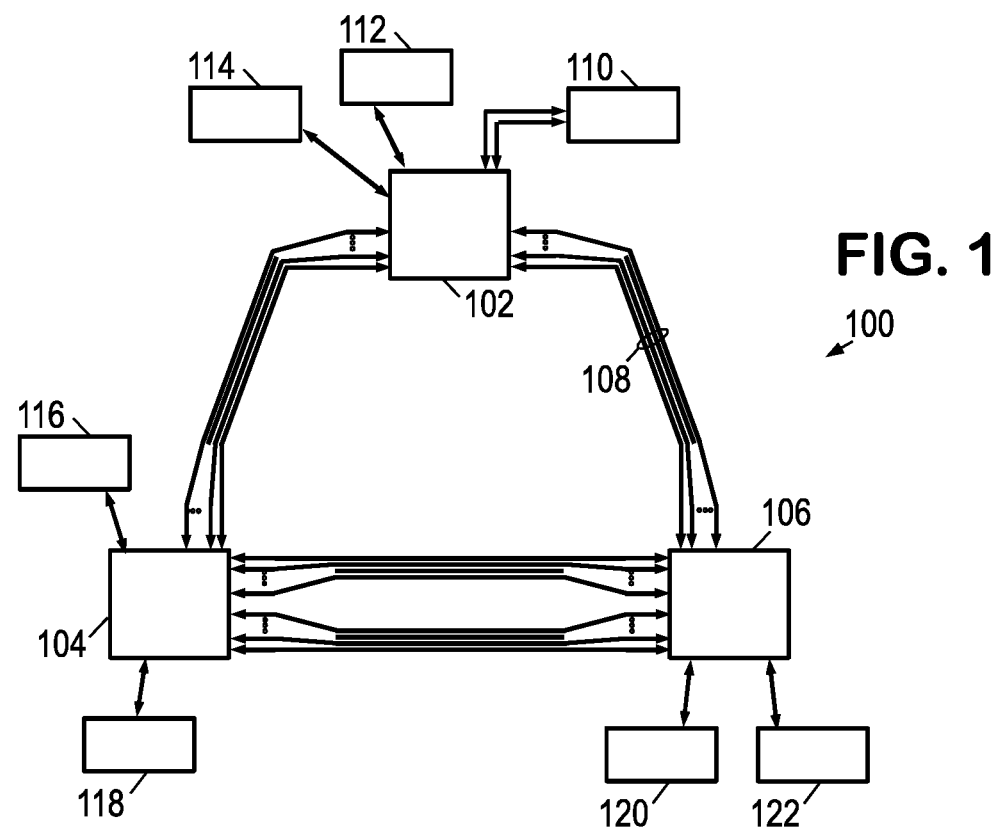
FIG. 1 shows an illustrative communications network.

It should be understood, however, that the specific embodiments given in the drawings and detailed description do not limit the disclosure. On the contrary, they provide the foundation for one of ordinary skill to discern the alternative forms, equivalents, and modifications that are encompassed in the scope of the appended claims.

TERMINOLOGY

An integrated circuit ("IC") die is a diced unit of an IC wafer. (Herein, "dice" will be employed as the plural form of a die.) The packaged form of a singular IC die, with nodes, pins, posts, pads, terminals, leads, bumps, balls, or other electrical contacts (collectively referenced herein as "contacts") ready for soldering or other electrically-connected incorporation into a larger electrical circuit or system, may be termed an IC chip. When multiple IC dice are packaged together, e.g., as a multi-chip module or system-in-package, the packaged unit is herein termed a "microelectronic assembly". The multiple IC dice may be attached directly to the package substrate, which can take the form of a laminated circuit board or a ceramic, glass, or semiconductor substrate, and generally has printed or etched traces significantly (orders of magnitude) larger than the traces on the IC dice. As this size discrepancy can adversely affect communications performance between the IC dice, at least some microelectronic assemblies employ so-called 2.5D or 3D technologies. In 3D technology, the IC dice are stacked atop each other to provide direct electrical connections between adjacent dice. However, such stacking can make it difficult for the package to provide adequate heat dissipation. In 2.5D technology, at least some of the IC dice are attached to an "interposer", which in turn may be attached to the package substrate. The interposer may be a silicon substrate that employs through-silicon vias (TSVs) to provide contacts on both its upper surface (for the IC dice) and its lower surface (for the package substrate). Traces on the interposer can more closely match the size of the traces on the IC dice for improved communications performance between the dice, and may incorporate intentional inductance and capacitance elements to provide better impedance matching with the contacts and traces on the package substrate. The term "substrate", when unqualified, may refer to a package substrate, an interposer, an IC die, or any other form of platform that provides contacts for electrically connecting the integrated circuit elements of the die to the other elements or external contacts of the microelectronic assembly.

DETAILED DESCRIPTION

The disclosed apparatus and methods are best understood in with reference to an illustrative context. Accordingly, FIG. 1 shows an illustrative communications network 100 having communications links 108 interconnecting nodes 102, 104, 106 (representing switches, routers, base stations, gateways, and other forms of communications equipment) that direct and relay communications signals between terminal nodes 110-122 (which may represent mobile devices, portable computers, workstations, servers, network-attached storage systems, and other such communications sources and destinations). The communications network 100 may be or include, for example, the Internet, a wide area network, or a local area network.

Communication links 108 may be wired or wireless communication channels. As one example, the communication links may be cables having bundles of electrical conductors or optical fibers, with each conductor or fiber carrying multiple modulated signals on corresponding channels. With such dense packing of information signals (which can also be found in other forms of wireless or wired communications links), highly integrated communications transceivers are advantageous for efficient interfacing with communications equipment. It is desirable to combine the integrated circuits for multiple transmitter modules and multiple receiver modules into a single packaged unit, such as a microelectronic assembly.

Figure 2:
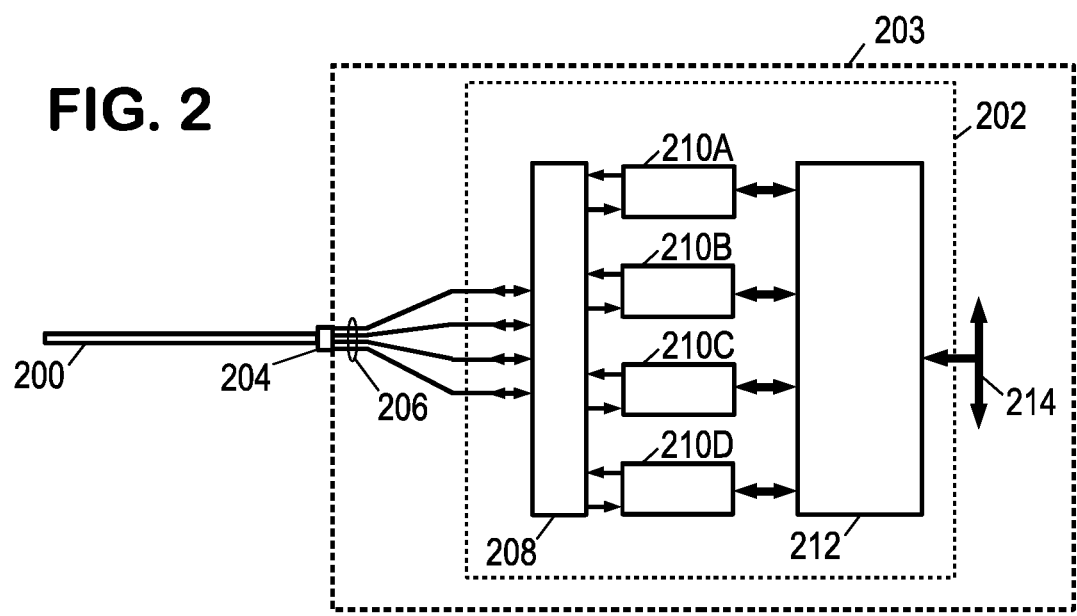
FIG. 2 is a function-block diagram of an illustrative transceiver.

FIG. 2 shows one such electrical cable 200 coupled to an illustrative transceiver 202 in a terminal node 203. A cable connector 204 couples electrical conductors of the cable 200 to signal leads 206. A directional coupler or hybrid 208 isolates the incoming signals on the signal leads 206 from the outgoing signals on each channel. (Some contemplated embodiments implement each channel as two separate, unidirectional receive and transmit lanes, eliminating any need for hybrid 208.) The incoming signals are coupled to the receivers in a set of serializer-deserializer ("SerDes") units 210A-210D. The receivers operate on the incoming signals to extract the corresponding streams of digital data. An interface module 212 buffers the streams of digital data and converts them to a suitable format for communications on the terminal node's internal bus 214, in accordance with a standard I/O bus protocol. In some embodiments, the conversion performed by the interface module 212 includes lane synchronization, error correction, and payload extraction.

From the internal bus 214, the interface module 212 also accepts digital data for transmission. In at least some embodiments, the interface module 212 packetizes the data with appropriate headers and end-of-frame markers, optionally adding a layer of error correction coding and/or a checksum. The interface module 212 provides the resulting transmit data streams to transmitters in the SerDes units 210A-210D. The transmitters convert the digital transmit data streams into analog electrical drive signals, which the hybrid 208 sends as outgoing signals on the signal leads 206.

The illustrative transceiver 202 supports four channels (i.e., four receive lanes and four transmit lanes), but this is not a limitation. At least some contemplated embodiments support 16 channels. Others support 64, 128, or 256 channels. In any case the transceiver 202 is preferably provided as a single integrated package, e.g., a multi-chip module. In accordance with 2.5D technology, up to 256 (or more) SerDes lane dice and an interface module die may be mounted in a flip-chip configuration on an interposer to create a single packaged microelectronic assembly module. The digital signals conveyed between the SerDes units and the interface module may be conveyed via interposer traces forming a parallel bus with an accompanying bus clock signal.

Figure 3:
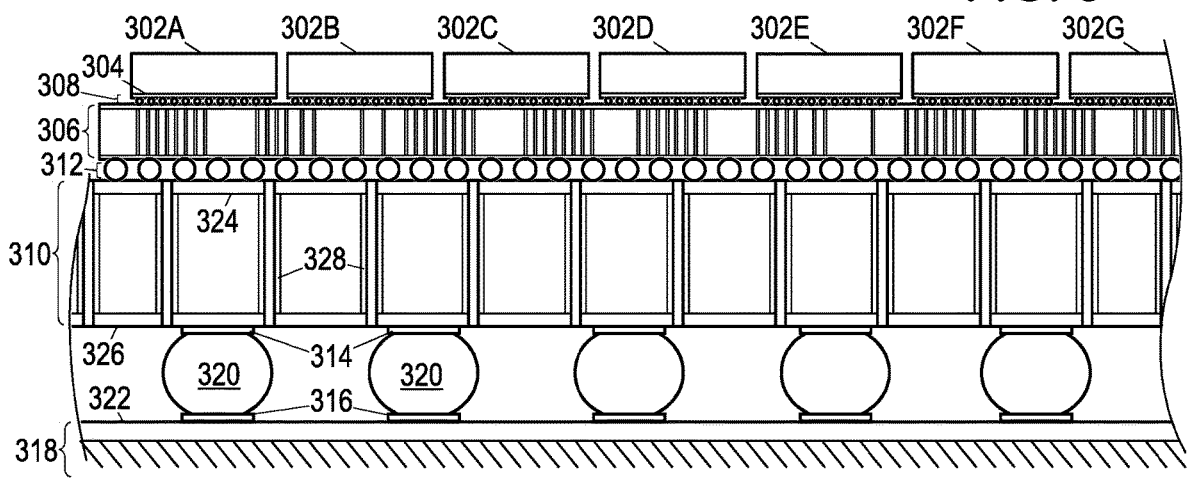
FIG. 3 is a partial cross-section of an illustrative microelectronic assembly.

FIG. 3 is a partial cross-section of an illustrative microelectronic assembly having multiple IC dice 302A, 302B, etc., with integrated circuitry 304 in a flip-chip configuration (i.e., with die substrate flipped to position the patterned areas and contacts adjacent to the mounting surface) attached to upper contacts of an interposer 306 by micro bumps 308. The lower contacts of interposer 306 are attached to the internal (upper) contacts of package substrate 310 by C4 ("Controlled Collapse Chip Connection") bumps 312. When the microelectronic assembly is incorporated into a larger system, the external (lower) contacts 314 of the package substrate 310 are attached to solder contacts 316 on the circuit board 318 (or other system substrate) by solder bumps 320. Printed circuit traces 322 on the circuit board 318, as well as vias 328 and printed circuit traces 324, 326 on the upper and lower surfaces of package substrate 310, electrically connect the C4 bumps 312 to the other components on the circuit board 318.

Though the figures are not drawn to scale, a typical micro bump diameter would be about 30 micrometers. The thickness of the IC dice 302A, 302B and interposer 306 may range as low as about 0.2 mm or slightly less, though more typical values would be about twice this minimum thickness. The interposer 306, of course, has length and width dimensions sufficient to accommodate all of the desired IC dice, and the package substrate has sufficient dimension to accommodate the interposer in turn. The typical C4 bump diameter is about 100 micrometers, with a pitch of about 160 micrometers. The integrated circuitry 304 is formed from layers of dielectric, polysilicon, and/or metal deposited and patterned over diffused dopant regions in accordance with established semiconductor device manufacturing techniques.

The SerDes dice may each provide approximately 150 contacts (sometimes referred to as "pins") for conveying digital signals between the dice and the interposer. If 256 such dice are included in the microelectronic assembly, there are nearly 40,000 contacts, each supported by an IO cell. If standard IO cells were used, the space and power requirements would be prohibitive, particularly at the contemplated frequencies (in the GHz range). Moreover, the standard IO cells would necessitate the use of traditional package/PCB level analog circuit simulation for reasons previously discussed, yet such simulation would be prohibitive. Fortunately, when interposer traces are used to convey digital signals between dice (aka "interchip connections"), the off-chip RC loading is substantially reduced and subject to significantly greater predictability. In other words, the IO cells for dice in 2.5D devices can be significantly simplified to reduce areal and power requirements, and further to enable the use of static timing analysis for package-level circuit verification.

As the inter-die interposer traces are substantially smaller and shorter than conventional substrate or circuit board traces, the large areas required by the pre- and post-driver structures of the standard IO cell (e.g., 0.002 mm² in the 28 nm process) are excessive. Moreover the post-driver circuit requires an extra, high voltage supply (thus requiring additional contacts on the die) and consumes substantial power to switch at 1-2 GHz frequencies. The rush current drawn drawn during such switching causes a dynamic supply voltage drop, increasing the potential for crosstalk and glitches. Further, the typical electrostatic discharge (ESD) protection elements of the standard IO cell are overengineered for the risks associated with interposer traces.

Figure 4:
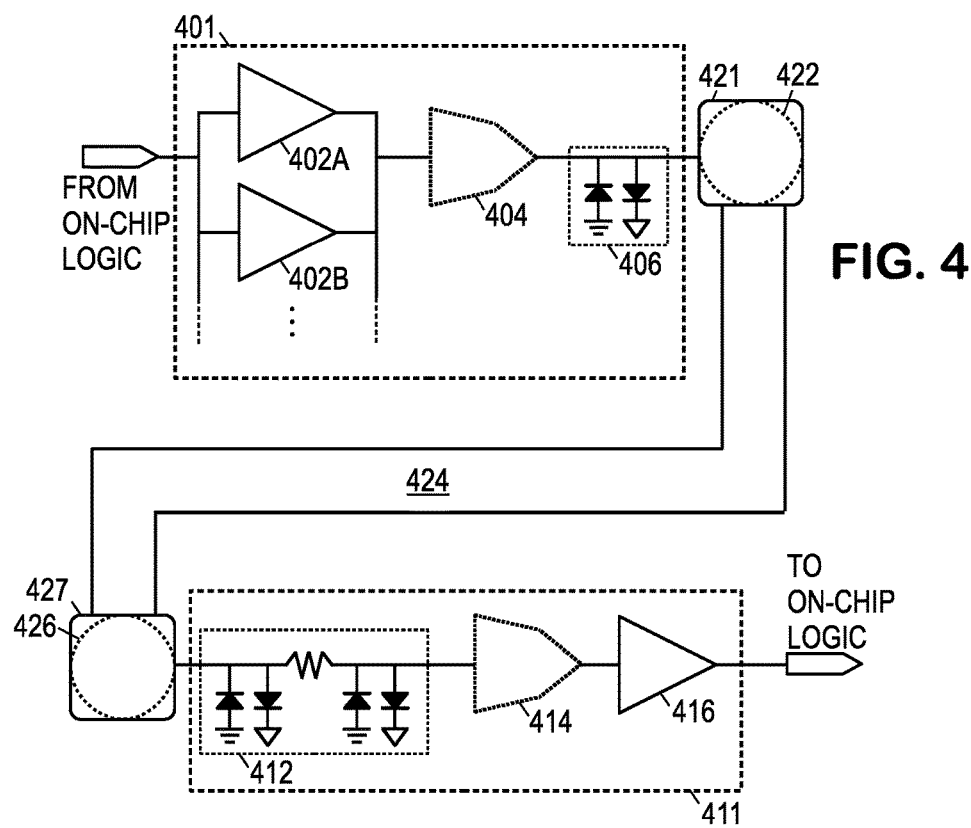
FIG. 4 is a schematic of illustrative IO cells connected by an interposer trace.

Accordingly, the IC dice designed for mounting on an interposer may employ more efficient, streamlined IO cells for connecting to interposer traces. FIG. 4 shows illustrative CMOS IO cells (a transmit IO cell 401 and a receive IO cell 411) for conveying digital signals between IC dice in a 2.5D microelectronic assembly. A transmit IO cell 401 receives a digital output signal from internal ("on-chip") logic. A set of one or more parallel CMOS buffers 402A-402B receives the digital output signal. The CMOS buffers may be standard buffer cells provided by the foundry, with the number provided in parallel being selected based on the length of the interposer trace 424, the loading capacitance, or something similar. Because the CMOS buffers are those designed for on-chip use, their areal and power requirements are minimal.

The combined output of the CMOS buffers 402A-402B is coupled to provide a digital transmit to an IO contact 421 for the die. (Optionally, a level-shifter 404 may be included as discussed further below.) A diode limiter 406 may be provided to limit the contact voltage to the range between ground and a positive supply voltage.

The IO contact 421 is coupled via an electrical connection (e.g., solder ball 422) to an interposer trace 424, which conveys the transmit signal to an IO contact 427 of another die. An electrical connection (e.g., solder ball 426) couples the trace 424 to the IO contact 427. To avoid confusion when accounting for propagation, attentuation, and other phenomena affecting the transmit signal as it is conveyed by trace 424, the signal at contact 427 is referred to herein as the receive signal.

An ESD component 412 may be included in the receive IO cell 411 to protect against excursions of receiving signal voltage and current beyond preset limits. As each end of an impedance element is maintained between ground and a supply voltage, the current through the impedance element cannot exceed the ratio of the supply voltage to the impedance. The illustrated ESD component 412 can be much smaller than a traditional ESD component as the ESD hazards associated with the interposer trace 424 are substantially reduced relative to those of package pins for connecting the microelectronic assembly to external circuitry.

Optionally, a level shifter 414 may shift the voltage of the receive signal downstream of the ESD component 412. A CMOS buffer 416 accepts the receive signal and forwards it to internal logic of the receiving die. As before, the CMOS buffer may be a standard buffer cell provided by the foundry for on-chip use, with minimal area and power requirements. The total capacitance of the illustrated diode limiter 406, contact 421, trace 424, contact 427, and ESD component 412 (including solder connections 422, 426) is expected to be less than 700 femtofarads if the length of trace 424 does not exceed 3 mm. In this case, the IO cells 401, 411 are expected to operate easily up to 2 GHz, consuming less than 0.2 microwatts for the pair.

In an alternative embodiment, the CMOS buffers 402, 416 are replaced with CMOS inverters. As the second inverter would reverse the first inversion, an equivalent operation can be achieved with potentially reduced complexity.

If the dice having the transmit IO cell 401 and the receive IO cell 411 operate from the same supply voltage, no level shifter (404, 414) is needed. If they operate from different supply voltages, at least one level shifter (404 or 414) would be employed for each communications link between the dice. As between dice for the SerDes units 210 and interface module 212, locating the level shifters in the IO cells of the interface module 212 would add a single power domain (i.e., a single additional supply voltage) to the interface module 212 which is likely to be far less burdensome than providing each of the SerDes units 210 with an additional power domain.

With the IO cell design of FIG. 4, the signal communication between dice in a 2.5D device can be characterized in terms of buffer delays (CMOS buffers 402, 416, and optionally one level shifter delay 404, 414) and an RC propagation delay for the capacticance associated with the diode limiter 406, contact 421, trace 424, contact 427, and ESD component 412 (including solder connections 422, 426). Electronic design automation (EDA) tools can perform a post-layout SPICE simulation to generate RC timing libraries for each trace while accounting for all power supply/temperature/process corner combinations. (Other suitable analog simulation tools include Ultrasim from Cadence and hfss from Ansys.) If not already available, timing libraries can be similarly determined for the standard library cells and other components in the dice of the 2.5D device (e.g., the SerDes units and the interface module). A timing library for the external IO interface of the 2.5D device may be constructed based on specifications for the device.

These libraries can then be supplied to a static timing analysis (STA) tool, such as those commercially available from Synopsys (Primetime) and Cadence (Tempus), together with a file representation of the circuit design, such as an HDL file. The STA tool can then analyze the design, including the communication paths between dice, to detect and report any timing violations. The tool implementing STA obtain a timing model for each element of the circuit design, including the circuit components and the signal communication paths between the components.

Figure 5:
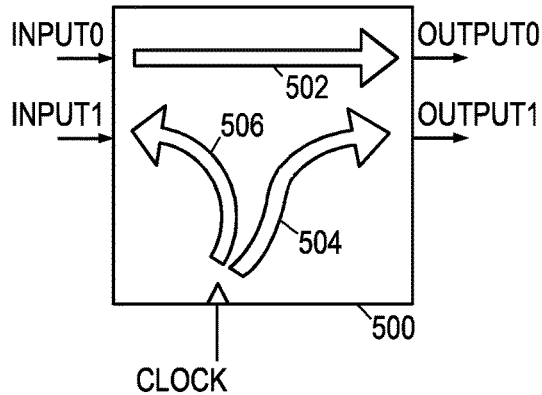
FIG. 5 is an illustrative circuit component having timing model properties.

FIG. 5 shows an illustrative element 500 with timing arcs 502-506 that establish timing relationships between input and output ports of the element. Output0 has an unclocked relationship to Input0 and thus timing arc 502 shows the relationship as a propagation delay. In contrast, Output1 has a clocked relationship to Input1, and thus timing arc 504 relates Output1 to the clock input with a propagation delay and timing arc 506 relates Input1 to the clock input with timing constraints for setup (minimum time data must be received before the clock transition) and hold (minimum time data must remain stable after the clock transition). For each delay and constraint value, the timing model may further specify an uncertainty range for the value, and may provide for dependence of the value on temperature, supply voltage, and other variables. In many cases the dependence may be nonlinear and the model may employ interpolation from a lookup table to determine the appropriate values and uncertainty range.

Figure 6:
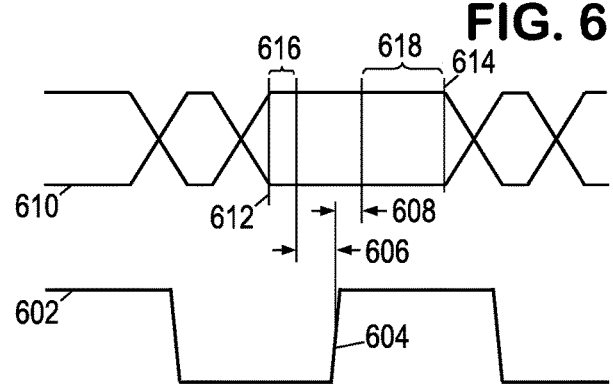
FIG. 6 is an illustrative timing diagram.

To further illustrate the constraints aspect of STA, FIG. 6 shows a clock signal 602 having a upward transition 604. The minimum setup time 606 and minimum hold time 608 set the timing constraints for the input data signal 610, i.e., the earliest and latest time at which the data is required to be present at the input port. The data arrival time 612 is compared to the earliest required time to measure the slack 616. The subsequent data arrival initiation time 614 is compared to the latest required time to measure slack 618. If either slack measurement is negative (i.e., data arrives after the earliest required time or changes before the latest required time), a timing violation has occurred and will be reported to determine whether an adjustment to the design is needed. Virtual clocks may be defined to impose timing constraints on inputs and outputs of unclocked elements.

Figure 7:
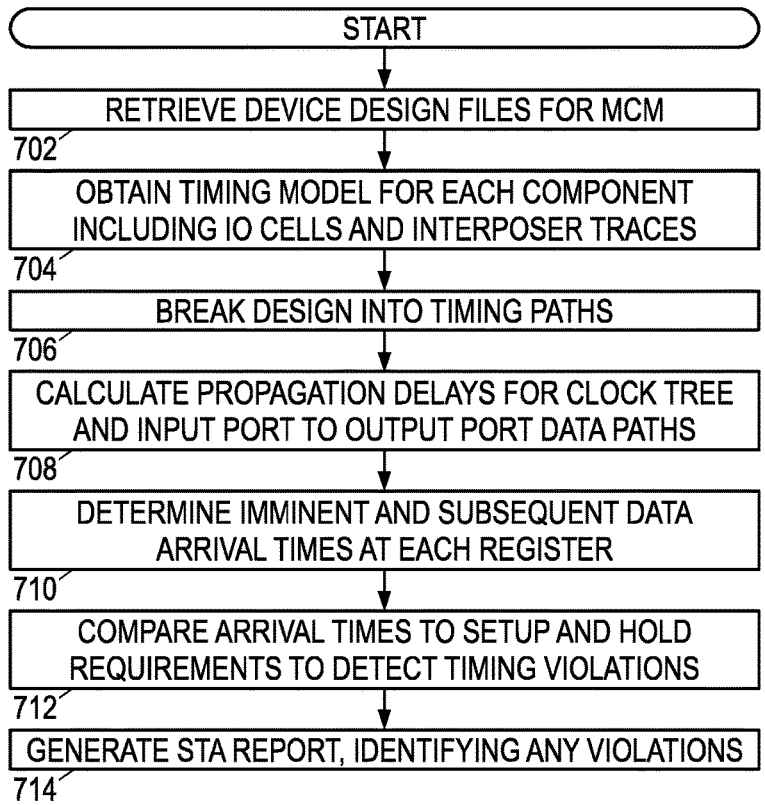
FIG. 7 is a flowchart of an illustrative static timing analysis method as applied to a 2.5D device.

FIG. 7 is a flow diagram of an illustrative circuit design verification method particularly suitable for application to a multichip module such as a 2.5D transceiver having multiple SerDes dice coupled via interchip connections on an interposer to an interface module die. Where the number of SerDes dice exceeds 100, 200, or more, static timing analysis may be the only feasible verification method if the number of pins on each die exceeds 100 or more, as may be expected when the interchip connections form wide parallel buses between the dice. The method begins in block 702 with an STA tool retrieving circuit design files for a multichip module. Such files may take the form of an HDL (hardware description language) file which may in turn refer to standard cell libraries for components of the IC dice.

In block 704, the STA tool obtains a timing model for each component of the circuit design, including the IO cells for the individual dice and the interposer traces forming the connections between the dice. In many cases, the timing libraries are available as part of the library of standard cells available from the foundry chosen for manufacturing the dice. Where such is not the case, the timing models can be determined via simulation, constructed from timing information about lower-level components, or defined based on design specifications. For interconnections, RC models may be used to estimate the propagation timing characteristics.

In block 706, the STA tool breaks the circuit design into timing paths that establish the timing relationships between inputs and outputs of the various circuit components. While the operation of available STA tools can differ, the timing paths may fall into different categories based on analysis conditions, such as: port-to-register data paths, register-to-register data paths, register-to-port data paths, asynchronous data paths, and clock tree paths. In block 708 the STA tool calculates the propagation delays for each segment of the clock tree paths and accumulates them to determine clock transition arrival times at each component, from which the earliest and latest data required times can be determined. Similarly, propagation delays and arrival times can be determined for the asynchronous data paths.

In block 710, the STA tool determines the propagation delays for each segment of the remaining data paths and accumulates them to determine data arrival times (including initiation of subsequent arrival times for the hold analysis). In block 712, the STA tool compares the arrival times to the earliest and latest data required times to verify that the setup and hold requirements are being met. The comparison may take the form of a timing slack calculation. A negative timing slack indicates a timing violation. In block 714, any such timing violations are reported to the user, including an identification of the port or component where the timing violation occurred and the associated circumstances (e.g., temperature, supply voltage). As the propagation times are affected by variables such as temperature and supply voltage, the calculations and comparisons are repeated over a range of such conditions to provide full validation.

Once said violations are reported to the user, the user may then adjust the circuit design to resolve the violation. Resolution can nearly always be achieved by the introduction of an additional register or flip-flop to modify the data arrival times relative to the clock transition, but other potentially suitable adjustments include buffers to delay either the data arrival time or the clock transition arrival time.

The STA tool may be implemented as a commercially available software package that runs on a general purpose computer system or network. Long term information storage, including storage of the application software, the standard cell libraries, the timing model libraries, and the HDL files for the circuit design, may be provided on nonvolatile mass storage systems such as magnetic disk drives, optical drives, flash memory, or the like. Fast information storage for retrieving and caching data and software instructions from the files in long term storage may be provided on volatile memory systems such as static or dynamic random access memory (SRAM or DRAM) or the like. One or more processor cores may access the local memory and information storage devices to access and execute the software packages that cause them to carry out the methods described herein. Input/output peripherals, such as keyboards, touch screens, pointing devices, displays, speakers, printers, network interface cards, and the like, enable a user to receive information from the system, and further enable the user to configure and initiate operation of the software to implement the desired operations. Further information on obtaining and using the software, including education on the underlying principles, is available from Synopsys and Cadence online and in the open literature.

At least some STA tools offer additional verification operations including RCC extraction (resistance, capacitance, and coupling model values), signal integrity (crosstalk energy) analysis, and static and dynamic power (IR drop) analyses. With the disclosed IO cells, these additional verification operations can also be applied to the 2.5D device.

Numerous alternative forms, equivalents, and modifications will become apparent to those skilled in the art once the above disclosure is fully appreciated. It is intended that the claims be interpreted to embrace all such alternative forms, equivalents, and modifications that are encompassed in the scope of the appended claims.

What is claimed is:

1. A circuit design verification method that comprises:
retrieving a design of a circuit that includes multiple integrated circuit dice connected via an interposer, each die having at least one contact for receiving or transmitting a digital signal conveyed by an interchip connection of the interposer, said circuit including an IO cell for each such contact, the circuit design including multiple serializer-deserializer dice coupled to an interface module die via parallel data buses formed of said interchip connections, the IO cells on said multiple serializer-deserializer dice excluding level shifters and the IO cells on the interface module die including level shifters;
obtaining a timing model for components of said circuit, the timing model accounting for propagation delays of said IO cells and propagation delays of said interchip connections;
performing a static timing analysis of the design using the timing model to determine data required times and data arrival times at each of said components;
comparing the data required times with the data arrival times to detect timing violations;
if such timing violations are found, reporting said timing violations for correction; and
if no such timing violations are found, providing the design for use in manufacturing the circuit.

2. The method of claim 1, wherein the parallel data buses each include a bus clock signal with transitions used for determining said data required times.

3. The method of claim 1, wherein said IO cells include transmit IO cells having a diode voltage limiter.

4. The method of claim 3, wherein said IO cells include receive IO cells having an electrostatic discharge protection component.

5. The method of claim 4, wherein each electrostatic discharge protection component comprises two diode voltage limiters separated by a fixed resistance.

6. The method of claim 1, wherein the timing model accounts for dependence of the propagation delays on temperature and supply voltage.

7. The method of claim 6, wherein said reporting identifies input or output ports where timing violations are detected along with an associated temperature and supply voltage.

8. The method of claim 1, wherein the design comprises over 200 dice connected to said interposer.

9. A transceiver that comprises:
an interposer;
an interface module die connected to the interposer; and
multiple serializer-deserializer (SerDes) dice connected to the interposer, which includes interchip connections coupling the serializer-deserializer dice to the interface module die,
wherein interface module die and the multiple SerDes dice each includes IO cells coupled to said interchip connections, each IO cell having an associated timing model for use in a static timing analysis, the IO cells on the multiple SerDes dice excluding level shifters and the IO cells on the interface module die including level shifters.

10. The transceiver of claim 9, wherein said multiple SerDes dice comprise over 100 SerDes dice connected to said interposer.

11. The transceiver of claim 9, wherein said multiple SerDes dice comprise over 200 SerDes dice connected to said interposer.

12. The transceiver of claim 9, wherein the interchip connections coupling the SerDes dice to the interface module die form parallel data buses each having a bus clock signal.

13. The transceiver of claim 12, wherein transitions in the bus clock signals are used during the static timing analysis to determine data required times for comparison with data arrival times.

14. The transceiver of claim 9, wherein said IO cells include transmit IO cells having a diode voltage limiter.

15. The transceiver of claim 14, wherein said IO cells include receive IO cells having an electrostatic discharge protection component comprising two diode voltage limiters separated by a fixed resistance.

16. The transceiver of claim 9, wherein the timing model accounts for dependence of propagation delays on temperature and supply voltage.

* * * * *